United States Patent
Taylor

(10) Patent No.: US 8,962,052 B2
(45) Date of Patent: Feb. 24, 2015

(54) CARBONATED BEVERAGES

(75) Inventor: Roy Kenneth Taylor, Huddersfield (GB)

(73) Assignee: Thos. Bentley & Son Limited, West Yorkshire (GB)

( * ) Notice: Subject to any disclaimer, the term of this patent is extended or adjusted under 35 U.S.C. 154(b) by 0 days.

(21) Appl. No.: 12/308,467

(22) PCT Filed: Nov. 28, 2007

(86) PCT No.: PCT/GB2007/004565
§ 371 (c)(1),
(2), (4) Date: Jan. 30, 2009

(87) PCT Pub. No.: WO2008/065401
PCT Pub. Date: Jun. 5, 2008

(65) Prior Publication Data
US 2010/0239727 A1    Sep. 23, 2010

(30) Foreign Application Priority Data

Nov. 29, 2006 (GB) .................................. 0623813.3
Jul. 6, 2007 (GB) .................................. 0713123.8

(51) Int. Cl.
| A23L 1/00 | (2006.01) |
| A23L 2/52 | (2006.01) |
| A23L 2/54 | (2006.01) |
| C12G 3/04 | (2006.01) |
| A23L 2/40 | (2006.01) |

(52) U.S. Cl.
CPC ... *A23L 2/54* (2013.01); *A23L 2/52* (2013.01); *C12G 3/04* (2013.01); *A23V 2002/00* (2013.01)
USPC ............ 426/329; 426/569; 426/106; 426/590

(58) Field of Classification Search
USPC ........................................................ 426/329
See application file for complete search history.

(56) References Cited

U.S. PATENT DOCUMENTS

| 3,436,227 | A | * | 4/1969 | Bergeron et al. ............. 426/329 |
| 3,751,263 | A |   | 8/1973 | Hall |
| 3,990,905 | A |   | 11/1976 | Wachala et al. |
| 4,105,802 | A |   | 8/1978 | Cho et al. |
| 4,221,600 | A |   | 9/1980 | Alexander |
| 4,421,804 | A |   | 12/1983 | Mori et al. |
| 4,451,390 | A |   | 5/1984 | Flannigan |
| 5,316,779 | A |   | 5/1994 | Morey |
| 5,378,484 | A |   | 1/1995 | Suwa et al. |
| 5,385,748 | A |   | 1/1995 | Bunger et al. |
| 5,568,973 | A |   | 10/1996 | Gorab |
| 5,738,900 | A | * | 4/1998 | Cuadrado et al. ............. 426/658 |
| 5,820,905 | A |   | 10/1998 | Osaka et al. |
| 6,180,159 | B1 |  | 1/2001 | Villagran et al. |
| 2003/0144365 | A1 | | 7/2003 | Schwartz et al. |
| 2004/0086619 | A1 | * | 5/2004 | Zhong et al. ................... 426/590 |
| 2004/0219274 | A1 | | 11/2004 | Cook |
| 2006/0051483 | A1 | | 3/2006 | Watanabe et al. |
| 2006/0286259 | A1 | * | 12/2006 | Hargreaves ................... 426/590 |
| 2007/0110874 | A1 | | 5/2007 | Fang et al. |
| 2007/0141203 | A1 | | 6/2007 | Cook |

FOREIGN PATENT DOCUMENTS

| EP | 0 502 603 | A1 | 9/1992 |
| EP | 0745329 | A1 | 12/1996 |
| EP | 1 504 678 | A1 | 2/2005 |
| GB | 2 254 771 | A | 10/1992 |
| GB | W09302177 | | 2/1993 |
| GB | W09408473 | | 4/1994 |
| GB | WO2009133391 | A1 | 11/2009 |
| GB | WO2009147416 | A1 | 12/2009 |
| JP | 54-126188 | | 10/1979 |
| JP | S54-126188 | | 10/1979 |
| JP | 02 027967 | A | 1/1990 |
| JP | H02-27967 | | 1/1990 |
| JP | 06-086660 | A | 3/1994 |
| JP | 686660 | A | 3/1994 |
| JP | 07-155148 | A | 6/1995 |
| JP | 7155148 | A | 6/1995 |
| JP | 10-295339 | A | 11/1998 |
| JP | 10295339 | A | 11/1998 |
| JP | 2001-103954 | | 4/2001 |
| WO | WO 01/92133 | A2 | 12/2001 |
| WO | WO 2006/042222 | A2 | 4/2006 |
| WO | WO 2007/021205 | A1 | 2/2007 |

OTHER PUBLICATIONS

Reply to EPO Opposition dated May 11, 2012 to communication dated Nov. 11, 2011, and to the EPO Opposition filed by the patent agency firm Thompson Gray LLP as Opponent; European Patent Application No. 07858765.6 from PCT/GB2007/004565 (10 pgs).
Japanese Office Action dated Apr. 19, 2012, Japanese Patent Application No. 2009-538782 (7 pgs).
Japanese Office Action English Translation dated Apr. 19, 2012, Japanese Patent Application No. 2009-538782 (4 pgs).
Response to Japanese Office Action dated Jul. 20, 2012; Japanese Patent Application No. 2009-538782 (7 pgs).
Response to Japanese Office Action English Translation dated Jul. 20, 2012, Japanese Patent Application No. 2009-538782 (8 pgs).
Letter and Third Party Protest under 37 CFR 1.291 dated Jun. 15, 2009, 22 pgs.
EFEMA Index of Food Emulsifiers; *European Food Emulsifier Manufacturers' Association*; Nov. 1999; pp. 6-35.
Joint FAO / WHO Food Standards Programme; *CODEX Alimentarius Commission*, Jul. 2001; 3 pgs.
Bamforth, C.W.; "The Relative Significance of Physics and Chemistry for Beer Foam Excellence: Theory and Practice"; *Journal of the Institute of Brewing*; vol. 110, No. 4; pp. 259-266 (2004).

(Continued)

Primary Examiner — D. Lawrence Tarazano
Assistant Examiner — Philip Dubois
(74) Attorney, Agent, or Firm — Nixon & Vanderhye P.C.

(57) ABSTRACT

Acidulated carbonated beverage containing a foam control agent and/or carbon dioxide control agent. The control agent contains a polyoxyethylene sorbitan fatty acid ester or a polyethylene glycol fatty acid ester.

7 Claims, No Drawings

(56) References Cited

OTHER PUBLICATIONS

Letter and Third Party Protest under 37 CFR 1.291 dated Dec. 24, 2009, including Exhibits A-D.
NOSAB Tab Review; Glycerol Monooleate; Nat'l Organic Standards Board Technical Advisory Panel Review; 16 pgs, Sep. 25, 2001.
Encyclopedia of Food Technology, Encyclopedia of Food Technology and Food Science Series, vol. 2, The AVI Publishing Company, Inc., Westport, CT, pp. 427-432, 1974.
A.A. Zotto, Antifoams and Release Agents; Food Additive User's Handbook, pp. 236-241 (1991).
C. Combs, Foams and Silicones in Food Processing, Dow Corning Corporation, pp. 844-846 (2000).
Dow Corning Chemical Manufacturing Solutions, Antifoam Selection Guide, Performance Chemicals from Dow Corning, 8 pgs., Dow Corning Corporation (2010).
SAG 710 Silicone Antifoam Emulsion, http://www.setonresourcecenter.com/msdshazcom/htdocs//HMIS/MSDS_DOD/139/B, 7 pgs., Feb. 10, 2011.
UK Intellectual Property Office Search Report under Section 17(5), British Application No. GB0713123.8, 3 pgs. Oct. 12, 2007.
PCT International Search Report, International Application No. PCT/GB2007/004565, International Filing Date Nov. 28, 2007, 3 pgs, mailed Apr. 17, 2008.
PCT Written Opinion, International Application No. PCT/GB2007/004565; International Filing Date Nov. 28, 2007, 5 pgs.
PCT International Preliminary Report on Patentability, International Application No. PCT/GB2007/004565, International Filing Date Nov. 28, 2007, 6 pgs.
EPO Examination Report, EPO Application No. 07 858 765.6-2114, dated Nov. 16, 2009, 3 pgs.
EPO Response, European Patent Application No. 07858765.6 from PCT/GB2007/004565, Improvements in or Relating to Carbonated Beverages, dated May 26, 2010, 23 pgs.
Response with English translation of claims dated Sep. 1, 2011 to the Russian Office Action dated Jun. 16, 2011, 10 pgs.
Patent Office of the Russian Federation, English translation of Office Action (Inquiry) of the State Examination, dated Jun. 16, 2011, Russian Patent Applicaiton No. 2009119289/10(026556), 13 pgs.
Y14006-PCT International Search Report, International Application No. PCT/GB2009/050427, International Filing Date Apr. 28, 2009, 4 pgs.
Y14006-PCT Written Opinion, PCT Application No. PCT/GB2009/050427, International Filing Date Apr. 28, 2009, 5 pgs.
Y14006-PCT International Preliminary Report on Patentability, International Applicaiton No. PCT/GB2009/050427, International Filing Date Apr. 28, 2009, 6 pgs.
Protest against Stephenson Group, Ltd. U.S. National Phase Patent Application for WO2009/133391, including Exhibits A-Q, filed Dec. 6, 2010, 29 pgs.
Y14005-PCT International Search Report, International Application No. PCT/GB2009/050428, International Filing Date Apr. 28, 2009, 4 pgs.
Y14005-PCT Written Opinion, International Application No. PCT/GB2009/050428, International Filing Date Apr. 28, 2009, 5 pgs.
Y14005-PCT International Preliminary Report on Patentability, International Application No. PCT/GB2009/050428, International Filing Date Apr. 28, 2009, 6 pgs.
Protest against Stephenson Group, Ltd. U.S. National Phase Patent Application for WO2009/133392, including Exhibits A-N, filed Dec. 6, 2010, 13 pgs.
Y14007-PCT International Search Report, International Application No. PCT/GB2009/050430, International Filing Date Apr. 28, 2009, 4 pgs.
Y14007-PCT Written Opinion, International Application No. PCT/GB2009/050430; International Filing Date Apr. 28, 2009, 6 pgs.
Y14007-PCT International Preliminary Report on Patentability, International Application No. PCT/GB2009/050430, International Filing Date Apr. 28, 2009, 7 pgs.
Protest against Stephenson Group, Ltd. U.S. National Phase Patent Application for WO2009/147416, including Exhibits A-T, filed Dec. 22, 2010, 21 pgs.
Kirk-Othmer, Food and Feed Technology, vol. 1, John Wiley & Sons, Inc., 3 pgs, 2008.
Kloek, et al; Effect of Bulk and Interfacial Rheological Properties on Bubble Dissolution; Journal of Colloid and Interface Science, vol. 237, pp. 158-166 (2001).
Brent S. Murray, Stabilization of Bubbles and Foams, Current Opinion in Colloid & Interface Science, vol. 12, pp. 232-241 (2007).
Murray, Brent S., Interfacial Rheology of Food Emulsifiers and Proteins, Current Opinion in Colloid & Interface Science, vol. 7, pp. 426-431 (2002).
Notice of Opposition to EP Patent No. EP2088876, Appln No. EP07858765.6, Date of mention of grant in the EP Patent Bulletin Dec. 29, 2010, Proprietor of the Patent—Stephenson Group Limited, Opponent—Thompson Gray LLP, 25 pgs.
Dow-Corning Antifoam 1500, www.us.chemicalbook.com, 2007, 2 pgs.
Notification of the First Office Action issued in Chinese Application No. 200780043878.1, dated Dec. 2, 2011, 6 pgs.

\* cited by examiner

CARBONATED BEVERAGES

This application is the U.S. National Phase of International Application PCT/GB2007/004565, filed 28 Nov. 2007, which designated the U.S. PCT/GB2007/004565 claims priority to British Application Nos. 0623813.3 filed 29 Nov. 2006 and 0713123.8 filed 6 Jul. 2007. The entire content of these applications are incorporated herein by reference.

The present invention relates to improvements in or relating to carbonated beverages. In particular the present invention relates to the combating of foaming and/or control of carbon dioxide in carbonated beverages, during filling of beverages and/or during dispensing.

By "foaming" herein we include the formation of an excessive and/or persistent foam head during filling or dispensing; and the spurting or gushing which may occur when a beverage container is opened.

By "filling" herein we mean filling of containers during manufacture, and thus include canning or bottling.

By "dispensing" or "pouring" herein we mean pouring of a beverage direct from a can or bottle (for example by a person in the home, or by a member of serving staff, for example a steward on an airline, or a bartender), as well as delivering from a mixer unit at home or a multimixer unit in a bar or restaurant.

Excessive foaming is a problem that has beset the food and drink industry for many years, and it is described at some length in NOSB TAP Review Compiled by OMRI on Glycerol Monooleate Processing (Sep. 25, 2001).

According to the "NOSB Review", and the many documents it references, mechanical and physical means including heating, centrifuging, spraying and ultrasound have been proposed to combat foaming problems.

Chemical foam control agents have also been proposed or employed (Kouloheris, A. P., Encyclopaedia of Food Technology (1974) 427-432; Zotto, A. A., Food Additives User's Handbook (1991) 236-241; Combs, C., Encyclopaedia of Food Science and Technology (2000) 844-846). Foam control agents disclosed therein include naturally occurring fats and oils, although reference is made to their effectiveness as foam control agents as being limited, due to their poor dispersability in oil/water emulsions. Other foam control agents disclosed in such references are glycerin, lecithin, silicon dioxide, silicones and glycerol monooleate. Use of glycerol monooleate is also discussed in the "NOSB Review".

The effectiveness of chemical foam control agents is said in the "NOSB Review" to depend on: a) the chemical nature and foaming tendency of the foam-forming food or drink; b) the solubility and concentration of the foam control agents; c) the presence of electrolytes, colloids or other surface-active agents; d) temperature, pH and viscosity; e) processing equipment; and f) the end use of the food or drink.

The many references within the "NOSB Review" represent a vast body of research on foam control and confirm that foam control is a significant issue in the food and drink industry.

As is well known, problems with foaming and/or spurting are particularly marked in carbonated soft drinks.

Problems with carbonated beverages may occur:
a) when a carbonated beverage undergoes manufacture, including filling, when substantial agitation is often unavoidable (US 2003/0144365 A1, EP 1504678A and "NOSB Review";
b) when a can or bottle containing a carbonated beverage spurts or gushes on being opened, perhaps having been agitated prior to dispensing, as occurs with cans or bottles dispensed by vending machines or shaken by being carried (U.S. Pat. Nos. 5,378,484 5,820,905);
c) when simply pouring a carbonated beverage from a bottle or can into a glass or cup (U.S. Pat. No. 5,316,779).

Minimising foaming during filling is especially important given its bottlenecking effect during plant operations and its consequent impact on cost, time and throughput volumes: "Containment and inhibition of foam is necessary in food processing for efficient operation of production equipment" ("NOSB Review").

EP 1 504 678A concerns the use of a chemical agent to reduce foaming in a carbonated beverage. It suggests that there is a particular foaming problem with carbonated beverages containing aspartame [APM] as a sweetener. It further states:

As the means for solving the foam formation during the beverage production process and the like, a silicone-based anti-foaming agent or an emulsifier-based anti-foaming agent such as sugar ester or the like, has heretofore been commonly used. However, it is the current situation that a satisfactory solution has not been yet devised which can satisfy both the aspect of sensory requirement and that of effect sustainability. Further, silicone-based anti-foaming agents carry a bad image with respect to safety.

Furthermore, it has been confirmed by the present inventors that these commonly used anti-foaming agents are not so effective for removing (eliminating) the foam attributable to APM.

The object of the invention of EP 1 504 678 A is to solve the over-foaming problems which arise in carbonated beverages containing aspartame. An emulsifier is proposed as the foam control agent, with an HLB value of 1 to 14 and, preferably, a molecular weight of 50-300. Preferred emulsifiers are glycerine fatty acid esters, particularly glycerine monofatty acid ester and diglycerine monofatty acid ester.

U.S. Pat. No. 5,316,779 discusses specifically the problem of pouring carbonated soft drinks which form a foam head which is large, and slow to collapse. It comments that carbonated beverages containing the artificial sweetener aspartame produce the most foaming, and the most persistent foam; but that root beer, with or without aspartame, is also persistent in foaming. It discloses the practical problems of serving carbonated beverages quickly, for example on airlines, at movies, at sporting events, in fast food chains and in restaurants and convenience stores. A solution described in U.S. Pat. No. 5,316,779 is to provide a disposable container coated on its inside (for example on the bottom and side walls of a cup) with an antifoaming agent. Suitable antifoaming agents are said to be commercially available food grade dimethyl polysiloxane antifoams, for example "Dow-Corning Antifoam 1500" and "Union Carbide SAG 710".

U.S. Pat. No. 5,568,973 describes an anti-foaming agent deposited on a stirring or straw element to be placed in a beverage receptacle. The anti-foaming agent speeds up the pouring process and is said to be useful in high volume environments, such airliners, convenience stores, and college bars. The preferred anti-foaming agent is a food grade silicone emulsion.

U.S. Pat. No. 5,820,905 focuses on the problem of "blow-off and splash of canned drinks" and describes a polyglycerol fatty acid ester as an antifoaming agent. A dispersing agent may be employed, having an HLB of at least 5. Examples include polyglycerol fatty acid esters, sucrose fatty esters, polypropylene glycol fatty acid esters, sorbitan fatty acid esters, organic monoglycerides, polysorbates, lactic acid ester derivatives, and the like. The drinks are non-carbonated drinks, which may still suffer from such problems, due to their being packaged with a positive pressure in the headspace of the cans.

In relation to the present invention polysorbates are of interest. In U.S. Pat. No. 5,820,905 the disclosure of such compounds is only as dispersing agents, not as anti-foaming agents.

U.S. Pat. No. 5,378,484 primarily describes the problem of spurting of the contents of a can containing a low acidity non-carbonated beverage on opening. It suggests the use of a sucrose fatty acid ester wherein the constituting fatty acid is at least one of a saturated fatty acid having from 12 to 22 carbon atoms and an unsaturated fatty acid having from 12 to 22 carbon atoms, and the average substitution degree from 4 to 7, as a foam control agent. Sucrose fatty acid esters are preferred examples. Furthermore the beverage may contain a hydrophilic emulsifying agent for further increasing the dispersability of the anti-foaming agent in water at a low temperature. As the foregoing hydrophilic emulsifying agent, an emulsifying agent having an ability for emulsifying the sucrose fatty acid ester in water as the effective component of the anti-foaming agent and having an HLB value of at least 10 is preferred. Practical examples of the hydrophilic emulsifying agent include a polyglycerol fatty acid ester, a sorbitan fatty acid ester, a polyoxyethylenesorbitan fatty acid ester, and a sucrose fatty acid ester. Moreover depending on a demand and purpose, the beverage of the present invention may properly contain other additives, for example lecithin, a glycerol fatty acid ester, a polyglycerol fatty acid ester, a sorbitan fatty acid ester, a propylene glycol fatty acid ester, an edible oil, and a dimethylsilicone oil. No anti-foaming action is suggested for polyoxyethylene fatty acid esters described in this patent. Certain compounds are presented as comparative examples, and are shown not to be effective in their antifoaming tests. They include SPAN 65 (which, is sorbitan stearic acid ester), glycerol oleic acid ester and a lesser-substituted grade of sucrose oleic acid ester.

JP 2-27967 (Showa 63-176296) describes preventing spurting on opening a drinks can, in particular containing a low acidity drink such as coffee, cocoa or black tea, by use of a foam control agent, which may be a glycerine fatty acid ester, a sorbitan fatty acid ester or a propylene glycol fatty acid ester.

JP 54-126188 (Showa 53-31122) describes an attempt to solve the problem of a carbonated beverage spurting or gushing from a bottle, on opening. The solution proposed is to provide a surface active agent within the bottle material. The surface active agent may suitably be a glycerine fatty acid ester, a sorbitan fatty acid ester, a propylene glycol fatty acid ester, a crotonamide, a polyoxyethylene glycerine fatty acid ester, a polyoxyethylene sorbitan fatty acid ester or a polyglyceryl fatty acid ester.

It will be apparent that very substantial efforts have been made to counter the problems documented in the prior art, of inefficiency in filling, and undesirable effects on dispensing, such as spurting or gushing on opening a bottle or can, and excessive or persistent foaming in a glass or cup.

The commonly-observed problems of foaming when opening cans and bottles and pouring the carbonated beverages suggest that the problem persists, particularly in aspartame-containing carbonated "diet" or "lite" beverages. As documented in some of the prior art documents mentioned above there is a particular difficulty in achieving foam control in aspartame-containing carbonated beverages.

A further problem associated with excessive foaming is excessive loss of carbon dioxide during filling. This is inefficient, not least in consideration of the energy required to produce bottled carbon dioxide; and it is an undesirable release of carbon dioxide into the environment. It would be desirable if this problem could be eased.

A yet further problem is the loss of "fizz" of carbonated beverages, when poured from a container into a drinking vessel. If excessive carbon dioxide is lost from the beverage there may be a marked deterioration in its drinking quality. A related problem is that the beverage left in the container (for example a reclosable bottle) may quickly lose its drinking quality or "fizz". A technical measure which solves or reduces this problem of drinking quality, related to foaming and/or retention of carbon dioxide, could be of high value.

In accordance with a first aspect of the present invention there is provided an acidulated carbonated beverage containing a foam control agent and/or carbon dioxide control agent, the control agent comprising a polyoxyethylene sorbitan fatty acid ester or a polyethylene glycol fatty acid ester.

The addition of a polyoxyethylene sorbitan fatty acid ester or polyethylene glycol fatty acid ester has a remarkable effect in relation to foam control, when a carbonated beverage is delivered to a vessel, whether the vessel be a can or bottle in a filling plant, or a drinking vessel such as a glass or cup. Foaming is significantly reduced. It appears to be the case with many beverages that excessive foaming is inhibited, and any foam head which is produced is more coarse and collapses more quickly. Consequently there arise the advantages, that less carbon dioxide is lost into the atmosphere during filling (giving economic and environmental benefit); and less carbon dioxide escapes from the beverage when it is poured into a drinking vessel (thereby giving better drinking quality). A further advantage from using a compound of one of the defined classes is that carbon dioxide appears to be retained for longer in the beverage in a container which has been opened. The familiar problem of bottled beverages going "flat" (or "losing their fizz") is thereby ameliorated.

Carbonation may be by addition of carbon dioxide or in some cases by a natural process of fermentation.

The beverage is a carbonated beverage, and by virtue of carbon dioxide (forming carbonic acid in water) the beverage is acidic. However, by the term "acidulated" we mean that it contains an additional acid of the type to be found in a "tangy" beverage. Examples may include phosphoric acid, and food acids (sometimes called "wholesome acids") such as citric acid, maleic acid, fumaric acid and tartaric acid. Fruit, fruit juices and fruit extracts contain food acids; and so beverages containing same are acidulated.

The beverage may be non-alcoholic. Examples include cola drinks, orange drinks, lemon drinks, lemonade, tonic water, root beer, ginger ale and ginger beer.

The beverage may be alcoholic, typically having 3-9% wt/wt ethanol. Examples include cider and so-called "alcopops", which are often carbonated blends of vodka or other spirits, with fruit flavourings. The beverage may be lightly alcoholic, typically having 0.1-3% wt/wt ethanol. Examples include shandy and certain fermented types of root beer, ginger beer and lemonade.

Preferably the beverage is not a dairy product, for example a milk-based or yoghurt-based beverage. Preferably it does not contain a dairy component, for example milk, cream, yoghurt or ice-cream.

Preferably the beverage is substantially fat-free.

Preferably the beverage is a flavoured water beverage.

Preferably the beverage is clear; that is to say, preferably it is not cloudy and/or turbid and/or opaque. Preferably it does not contain a hydrophobic clouding agent, for example a sterol ester or a stanol ester.

In principle the beverage may contain vitamins, for example one or more of A, B, C, D, E and K group vitamins.

Vitamins may be added in addition to vitamins present in other components, such as fruit juice. Water-soluble vitamins B and C are very suitable components of the beverage. Fat soluble vitamins A, D, E and K are less so. Preferably vitamin E or derivatives thereof are not present in the beverage. Preferably vitamins A and K, or derivatives thereof, are not present in the beverage.

Preferably the beverage contains a sweetening agent. The sweetening agent may be a natural or synthetic sweetening agent, for example sugar, corn syrup, sugar alcohol (for example sorbitol, xylitol, mannitol, maltitol or isomalt), or an intense sweetener (for example saccharin, sucralose, neotame, acesulfame potassium or aspartame).

Preferably the beverage contains one or more intense sweeteners, for example aspartame.

In preferred embodiments the beverage does not contain sugar.

Preferably the control agent, i.e. the foam control agent and/or carbon dioxide control agent as defined herein (which may include just one compound of one or other of the classes of compounds stated or a mixture of compounds of one or other of the classes of compounds stated or a mixture of one or more compounds of one class and one or more compounds of the other class) is the only agent present in the beverage to achieve foam control and/or control over carbon dioxide release. That is to say, there is no control agent other than a polyoxyethylene sorbitan fatty acid ester and/or a polyethylene glycol fatty acid ester. Preferably no compound intended to promote or boost the activity of the control agent is present.

Preferably the control agent has a molecular weight in the range 200-3000, preferably 300-2500, preferably 400-2000.

Preferably the control agent has an HLB value in the range 7-16, preferably 7-14, more preferably 7-12.

For polyoxyethylene sorbitan fatty acid esters a preferred HLB range is 9-16, preferably 10-12.

Preferred polyoxyethylene sorbitan fatty acid esters, and their HLB values, are as follows:
Polyoxyethylene-(20)-sorbitan tristearate (common name Polysorbate 65) HLB value 10.5-11.0
Polyoxyethylene-(20)-sorbitan trioleate (common name Polysorbate 85)-HLB value 11.0
Polyoxyethylene-(4)-sorbitan monolaurate (common name Polysorbate 21)-HLB value 13.3
Polyoxyethylene-(20)-sorbitan monostearate (common name Polysorbate 60)-HLB value 14.9
Polyoxyethylene-(4)-sorbitan monostearate (common name Polysorbate 61)-HLB value 9.6
Polyoxyethylene-(20)-sorbitan monooleate (common name Polysorbate 80)-HLB value 15.0
Polyoxyethylene-(5)-sorbitan monooleate (common name Polysorbate 81)-HLB value 10.0.

In the case of polyethylene glycol esters of fatty acids a preferred HLB range is 7-13, preferably 7-11. Examples include:
PEG 200 monooleate (HLB 8.2)
PEG 300 monooleate (HLB 10.2)
PEG 400 dioleate (HLB 8.3)
PEG 200 monolaurate (HLB 9.3)
PEG 300 dilaurate (HLB 7.9)
PEG 400 dilaurate (HLB 9.7)
PEG 200 monostearate (HLB 8.1)
PEG 300 monostearate (HLB 10.3)
PEG 400 distearate (HLB 8.5)
PEG 600 distearate (HLB 10.7)
PEG 600 dioleate (HLB 10.6)

Compounds of these chemical classes are widely accepted by regulatory authorities as being non-toxic. They include compounds which are permitted for use in food and beverage products by both the relevant authorities in the US and in the EU.

HLB number is defined in terms of the widely used method of Griffin. In accordance with this method the molecular weight of the ethylene oxide part of the respective compound is calculated. For example if there are 20 moles of ethylene oxide the molecular weight of that component is 880 (20×44). To this number is added the molecular weight of the fatty acid residue (e.g. monooleate, dilaurate etc.), this essentially gives an overall molecular weight. The molecular weight of the ethylene oxide part is expressed as a percentage of the overall molecular weight, and the resulting percentage value is divided by 5, to yield the HLB value (thus, if the ethylene oxide represents 55% of the total compound weight, the HLB value of the respective compound is 11).

The control agent is preferably present in an amount of at least 0.01 mg/l, preferably at least 0.04 mg/l, preferably at least 0.08 mg/l, preferably at least 0.12, preferably at least 0.2 mg/l. In certain embodiments it is present in an amount of at least 0.5 mg/l, especially at least 1 mg/l.

The control agent is preferably present in an amount of up to 250 mg/l, preferably up to 100 mg/l.

Such concentration ranges refer to the total amounts of control agents present, when more than one such compound is present.

In the case of a polyoxyethylene sorbitan fatty acid ester such a compound is preferably present in an amount of at least 0.01 mg/l, preferably at least 0.04 mg/l, preferably at least 0.08 mg/l, preferably at least 0.12, preferably at least 0.2 mg/l. In certain embodiments it is present in an amount of at least 0.5 mg/l, especially at least 1 mg/l.

In the case of polyoxyethylene sorbitan fatty acid ester such a compound is preferably present in an amount up to 100 mg/l, preferably up to 50 mg/l, preferably up to 30 mg/l, preferably up to 15 mg/l.

Such concentration ranges refer to total amounts of polyoxyethylene sorbitan esters present, when more than one such compound is present.

In the case of a PEG ester of a fatty acid such a compound is preferably present in an amount of at least 5 mg/l, preferably at least 50 mg/l.

In the case of a PEG ester of a fatty acid such a compound is preferably present in an amount up to 250 mg/l, preferably up to 100 mg/l.

Such concentration ranges refer to total amounts of PEG esters present when more than one such compound is present.

When both a polyoxyethylene sorbitan ester and a PEG ester are present, the total concentration is preferably within the overall limits given above (the broadest being 0.01 to 250 mg/l); and the polyoxyethylene sorbitan ester(s) is/are preferably within one or more of the ranges given for the polyoxyethylene sorbitan ester(s); and the PEG compound(s) is/are preferably within one or more of the ranges given for the PEG compounds.

Preferably the PEG part of the PEG esters of a fatty acid is a low molecular PEG moiety, for example a PEG 50—PEG 2000 moiety, preferably a PEG 100—PEG 1000 moiety.

Preferably a control agent (either a polyoxyethylene sorbitan ester or a PEG ester), used in the present invention comprises at least one mole of ethylene oxide per mole of ester; preferably at least 2, preferably at least 3, more preferably at least 4. Preferably it contains up to 36 moles of ethylene oxide per mol of fatty acid ester, preferably up to 24, preferably up to 12, most preferably up to 7.

The presence, in the polyoxyethylene sorbitan ester or PEG ester, of other alkylene oxide moieties such as propylene oxide, is not excluded. However, some polyoxyethylene component must be present, and the polyoxyethylene component itself preferably conforms to the molar definitions given above, without reference to any additional alkylene oxide component. Most preferably, however, the polyoxyethylene component contains ethylene oxide units, and no other alkylene oxide units.

Preferably the fatty acid residues of the defined compounds are residues of $C_6$-$C_{33}$ fatty acids, preferably $C_{10}$-$C_{22}$ fatty acids. The fatty acids may be saturated (for example lauric, stearic) or unsaturated (for example oleic). Typically the compound may have from one to the saturation number of fatty acid residues (the compound being, for example a monooleate, dioleate, monostearate, distearate, monolaurate or dilaurate; or, in the cage of a sorbitan compound, being a trioleate or tristearate, for example).

It will be appreciated that many of the parameters expressed above for a control agent of the invention are mean values, given that the control agents are distributions of compounds; for example molecular weight, HLB and number of carbon atoms per molecule or residue. A similar comment applies to degree of ethoxylation, given that ethoxylation produces a distribution.

Preferably the control agent is added to the beverage, or to a precursor therefor (including a concentrate) as a liquid. The control agent may itself be a liquid at ambient temperature, or it may be liquefiable, for example by heating it in order to melt it, or by dissolving or dispersing it in a liquid carrier.

In accordance with a second aspect of the present invention there is provided a sealed container containing a carbonated beverage of the first aspect. The sealed container is suitably of a pressure-resisting construction, such as a metal can or a deformation-resistant plastics bottle.

In accordance with a third aspect of the present invention there is provided a concentrate for a beverage of the first aspect, the concentrate being mixed in use with water and injected with carbon dioxide, or mixed with carbonated water to produce said beverage substantially at the time of dispensing. The present invention may in this way be utilised in situations such as bars and restaurants, where a carbonated beverage is produced in situ, using what is commonly called post-mix or multimixer apparatus.

In accordance with a fourth aspect of the present invention there is provided a method of making a beverage of the first aspect, comprising adding a said control agent to a base beverage (that is, a beverage lacking only the control agent) or a precursor therefor. The precursor could be a non-carbonated diluted form, or a concentrate, or an ingredient, or an ingredient mix. The method may include the step of sealing the beverage in pressure-resistant containers. It is found that in accordance with the present invention the filling process is much quicker than without the control agent. The amount of foam formed is reduced, and it collapses more quickly. Both phenomena lead to increased filling rates.

Without being bound by theory it is believed that a control agent as used herein makes it more favoured for the carbon dioxide to stay in the beverage solution (or, put another way, less favoured for it to burst out of the beverage solution, as carbon dioxide bubbles). Thus we believe that less carbon dioxide is available to make foam. We believe this means that less foam forms; and that more carbon dioxide is retained within the beverage, which stays fizzier. In accordance with our view a foam control agent and/or carbon dioxide control agent may be regarded as a carbon dioxide stabiliser, by which we mean an agent which stabilises carbon dioxide in the beverage or promotes the retention of carbon dioxide in the beverage, and such terms may be used in place of "foam control agent and/or carbon dioxide control agent", in this specification.

In accordance with a fifth aspect of the present invention there is provided a method of reducing foaming and/or improving retention of carbon dioxide in an acidulated carbonated beverage, the method comprising the inclusion, in the beverage, of a compound as defined above.

In accordance with a sixth aspect of the present invention there is provided the use, for the purpose of reducing foaming and/or improving retention of carbon dioxide in a carbonated beverage, of a compound as defined above.

The invention will be further described, by way of illustration only, with reference to the following examples.

EXAMPLE SET 1

Experiments to assess foaming properties were carried out employing commercially available Polysorbate 65 (HLB 10.5; sold under the trade mark Kotilen S/3), otherwise known as polyoxyethylene-(20)-sorbitan tristearate, as the control agent, and three commercial carbonated cola drinks, identified as follows:

A) Cola beverage No. 1 (an artificially sweetened cola containing aspartame and acesulfame potassium intense sweeteners but no sugar)

B) Cola beverage No. 2 (an artificially sweetened cola containing aspartame and acesulfame potassium intense sweeteners, but no sugar)

C) Cola beverage No. 3 (a sugar-sweetened cola without artificial sweeteners)

Cola beverage No. 1 and Cola beverage No. 3 were made by one manufacturer. Cola beverage No. 2 was made by another manufacturer, as a competitor product to Cola beverage No.

1.

An aqueous dispersion of Polysorbate 65 was prepared by adding it to hot water at approximately 50° C., mixing and allowing the mixture to cool to 20° C., to produce a 0.5% w/w aqueous dispersion. Appropriate quantities of this mixture were introduced by pipette into full 500 ml bottles of the beverages, the caps having been removed, then replaced tightly. The bottles were inverted 25 times using a smooth action, to obtain a uniform dispersion before allowing it to equilibrate for one hour at ambient temperature (20° C.). Controls were treated in a similar way, but with 1.0 g of water being added to the beverages instead of the test solutions containing Polysorbate 65.

Cola was poured from each bottle in turn into tared standard size half-pint (300 ml brimful capacity) plastic cups, in a continuous smooth stream from a height of 25 cm, until the cups were about to overflow. Pouring was then terminated. The pouring action was repetitive and consistent between samples, and was carried out as fast as could be done smoothly. The cups were then reweighed to establish the amount of beverage they contained, this being the maximum amount that could be poured without spillage, hence giving a reliable indication of the level of foaming. The results are listed below:

| Concentration of Polysorbate 65 | Weight of beverage |
|---|---|
| A) Cola beverage No. 1 | |
| Control | 92.2 g |
| 1.0 mg/l | 126.3 g |
| 2.5 mg/l | 151.4 g |
| 5.0 mg/l | 150.1 g |
| 10.0 mg/l | 214.8 g |
| 15.0 mg/l | 215.1 g |
| B) Cola beverage No. 2 | |
| Control | 91.2 g |
| 1.0 mg/l | 219.4 g |
| 2.5 mg/l | 240.0 g |
| 5.0 mg/l | 227.0 g |
| 10.0 mg/l | 223.4 g |
| 15.0 mg/l | 230.4 g |
| C) Cola beverage No. 3 | |
| Control | 109.3 g |
| 1.0 mg/l | 245.1 g |
| 2.5 mg/l | 284.9 g |
| 5.0 mg/l | 285.1 g |
| 10.0 mg/l | 257.3 g |
| 15.0 mg/l | 259.0 g |

Clearly very low concentrations of Polysorbate 65 are able to achieve significant foaming reduction, particularly in the case of the artificially sweetened beverages.

Furthermore, foams generated during the pouring of treated beverages are less dense (or coarser) than those of their untreated counterparts, especially in the case of artificially sweetened drinks. Also, they collapsed more quickly. This may be one factor in the increased weight of beverage that can be poured; the other likely factor—being the reduced foam head that forms. Both factors the reduced foam heads and the faster collapse of the foam heads which did form - were empirically observed. Another empirical observation was that the beverages containing a foam control agent were of better taste than the control. Comments included that the former were "tangy" and "noticeably fizzier" and that the latter was "flatter" and "dull tasting". It is believed that the difference observed was because the latter had lost more carbon-dioxide.

The combination of the reduced foaming and the rapid foam collapse effects affords obvious advantages with respect to fill speeds upon bottling and canning, and further advantages on dispensing. The taste advantage gives a further important benefit, directly to the consumer.

EXAMPLE SET 2

Further work was done on own-label carbonated tonic waters, purchased in 1 litre bottles, from a leading UK supermarket. The tonic waters differ from the colas tested in Example Set 1 in that the carbon dioxide content is much higher. The labels indicated that the tonic waters were acidulated with citric acid.

A 0.51 w/w Polysorbate 65 sample was initially prepared in the same way as for Example Set 1, but was diluted giving 0.0011 w/w and 0.0051 w/w Polysorbate 65 to treat the tonic water bottles. Dosage was carried out in a similar way to Example Set 1, except that they were allowed to stand overnight to equilibrate after mixing due to the 'lively' nature of the products. 1-5 g quantities of the dilutions were used to accurately dose foam/$CO_2$ control agent to the bottles, and the controls were treated in the same way, with 3 g of water. Beverage was poured into tared 300 ml brimful capacity plastic beakers and the beakers reweighed. The procedure was as described above.

The beverages were identified as follows:
A) Low Calorie Indian Tonic Water, tonic water No. 1. The label indicated it was sweetened with aspartame and sodium saccharin.
B) Indian Tonic Water, tonic water No. 2. The label indicated it was sweetened with sugar and sodium saccharin.

The results are shown below.

| Concentration of Polysorbate 65 | Weight of beverage |
|---|---|
| Tonic Water No. 1 | |
| Control | 117.2 g |
| 0.01 mg/l | 123.7 g |
| 0.02 mg/l | 122.9 g |
| 0.03 mg/l | 124.4 g |
| 0.04 mg/l | 138.0 g |
| 0.05 mg/l | 150.2 g |
| 0.08 mg/l | 186.3 g |
| 0.10 mg/l | 234.2 g |
| 0.15 mg/l | 275.2 g |
| Tonic Water No. 2 | |
| Control | 123.4 g |
| 0.01 mg/l | 128.5 g |
| 0.02 mg/l | 135.3 g |
| 0.03 mg/l | 143.4 g |
| 0.04 mg/l | 141.0 g |
| 0.05 mg/l | 155.3 g |
| 0.08 mg/l | 222.1 g |
| 0.10 mg/l | 250.2 g |
| 0.15 mg/l | 259.7 g |

A beneficial effect can be seen with as low as 0.01 mg/l Polysorbate 65, with the magnitude of the effect increasing with increasing concentration.

EXAMPLE SET 3

Further work was done to determine the efficacy of further compounds as control agents having a beneficial effect of foam or foaming or carbon dioxide retention. The beverage employed was a proprietary carbonated diet cola drink, purchased in 500 ml bottles. The testing took place in the manner described in Example Set 1. The table below sets out the compounds tested, their concentrations, and the volumes captured in the cup.

| Control agent | Concentration | Quantity in cup | HLB of control agent |
|---|---|---|---|
| PEG 600 Dioleate | 100 mg/l | 237.5 g | 10.6 |
| PEG 400 Dioleate | 80 mg/l | 239.9 g | 8.3 |
| | 40 mg/l | 221.5 g | |
| | 20 mg/l | 182.7 g | |
| | 10 mg/l | 162.3 g | |
| PEG 300 Monooleate | 100 mg/l | 265.0 g | 10.2 |
| | 20 mg/l | 187.8 g | |
| PEG 200 Monooleate | 100 mg/l | 242.9 g | 8.2 |
| Sorbitan Trioleate (20 EO) (Polysorbate 85) | 20 mg/l | 289.2 g | 11.0 |
| | 10 mg/l | 261.0 g | |
| | 5 mg/l | 146.8 g | |
| Sorbitan Monostearate (20 EO) (Polysorbate 60) | 20 mg/l | 146.4 g | 14.9 |
| Sorbitan Monolaurate (comparison) | 100 mg/l | 125.0 g | 8.6 |
| Control | — | 114.2 g | n/a |

It was also attempted to use sorbitan monostearate (comparison; HLB 4.7) and sorbitan monooleate (comparison; HLB 4.3) in the manner of sorbitan monolaurate. Unlike sorbitan monolaurate, sorbitan monostearate and sorbitan monooleate could not even be dispersed into water to a satisfactory degree, even with the aid of an emulsifying ester. Accordingly no pour test could be carried out on these compounds.

EXAMPLE SET 4

Further work was done on carbonated alcoholic fruit beverages (commonly known in the UK as "alcopops").

A) The first product tested was a branded "white rum and blueberry" half-sugar beverage (reduced sugar, further sweetened by a non-sugar source of sweeteners), containing 4% alcohol, supplied in 275 ml bottles sealed with a crown cap. A Polysorbate 65 composition was prepared as described in Example Set 1. The caps of bottles were carefully removed, with minimal shaking of bottles, and the bottles were dosed with desired quantities of the Polysorbate 65 composition. The bottles were then re-capped using a crown cap corking tool. The re-capped bottles were left to stand overnight.

The following day bottles were opened in turn and the beverages poured into 300 ml plastic cups as described above for Example Set 1, and the contents weighed. The results are listed below.

| Concentration of Polysorbate 65 | Weight of beverage |
|---|---|
| Control | 179.1 g |
| 1.8 mg/l | 215.5 g |
| 3.6 mg/l | 226.7 g |
| 5.5 mg/l | 242.0 g |
| 10.9 mg/l | 270.7 g |
| 18.2 mg/l | 274.9 g |

B) The second "alcopop" product tested was a supermarket own-label "vodka and cherry" mixed sugar/sweetener beverage, containing 4% alcohol, and supplied in 700 ml bottles, sealed with a screw cap. The procedure used Polysorbate 65 and was as described in Example Set 1. The results are listed below.

| Concentration of Polysorbate 65 | Weight of beverage |
|---|---|
| Control | 161.5 g |
| 2.1 mg/l | 267.9 g |
| 3.6 mg/l | 276.4 g |
| 7.1 mg/l | 284.3 g |
| 14.3 mg/l | 292.6 g |

CONCLUDING REMARKS RELATING TO THE EXAMPLE SETS

Example Set 3 suggests that sorbitan monolaurate, sorbitan monostearate and sorbitan monooleate are ineffective or inadequate, in any attempt to solve the problems the present invention seeks to solve.

Example Sets 1, 2 and 3 suggest that a sorbitan fatty acid ester requires a polyoxyethylene segment to be effective in the present invention.

Example Set 3 suggests that a polyethylene glycol fatty acid ester, also having a polyoxyethylene segment, can be used in the present invention.

Example Sets 1, 2 and 3 also suggest that whilst Polysorbate compounds such as Polysorbate 60 with somewhat high HLB values could be used with some benefit, better results may be obtained using Polysorbate compounds such as Polysorbate 65 (Example Sets 1 and 2) and Polysorbate 85, having lower HLB values.

Example Set 3 also suggests that the concentration of PEG esters needed to achieve a good foam control effect is higher than the concentration of Polysorbates needed to achieve a good foam control effect.

Example Sets 1-3 show benefit in non-alcoholic drinks (soft drinks). Example Set 4 shows benefit in alcoholic fruit drinks ("alcopops").

The invention claimed is:

1. A method of reducing foaming and/or improving retention of carbon dioxide in an acidulated carbonated non-dairy beverage containing one or more additional acids, the method comprising the steps of:
   providing an acidulated carbonated non-dairy beverage, and
   introducing into said beverage a foam control agent and/or carbon dioxide control agent,
   the control agent comprising a polyoxyethylene sorbitan fatty acid ester selected from polyoxyethylene-(20)-sorbitan tristearate or polyoxyethylene-(20)-sorbitan trioleate or a mixture thereof, the foam control agent being present in a concentration range from 0.1 to 30 mg/l.

2. The method as claimed in claim 1 wherein the beverage contains a sweetening agent.

3. The method as claimed in claim 1 wherein the polyoxyethylene sorbitan ester is Polyoxyethylene-(20)-sorbitan tristearate.

4. The method as claimed in claim 2 wherein the sweetening agent is an intense sweetener.

5. The method as claimed in claim 2 wherein the control agent comprises a polyoxyethylene sorbitan fatty acid ester in a concentration range 1 to 30 mg/l.

6. The method as claimed in claim 5 wherein the control agent comprises a polyoxyethylene sorbitan fatty acid ester in a concentration range 2 to 15 mg/l.

7. The method as claimed in claim 1 wherein the additional acid is selected from the group consisting of phosphoric acid, citric acid, maleic acid, fumaric acid and tartaric acid.

* * * * *